United States Patent [19]
Sakai et al.

[11] Patent Number: 6,158,561
[45] Date of Patent: Dec. 12, 2000

[54] CLUTCH PLATE

[75] Inventors: Naoyuki Sakai, Anjo; Kunihiko Suzuki, Gamagori; Naoyuki Kokubo, Aichi-ken; Takashi Hosokawa, Kariya; Hirokazu Suzuki, Toyota; Akihiko Ikeda, Aichi-ken; Mitsuru Ohba, Anjo, all of Japan

[73] Assignees: Toyoda Koki Kabushiki Kaisha, Kariya; Toyota Jidosha Kabushiki Kaisha, Toyota, both of Japan

[21] Appl. No.: 09/282,170

[22] Filed: Mar. 31, 1999

[30] Foreign Application Priority Data

Apr. 1, 1998  [JP]  Japan ................................. 10-088948
Apr. 6, 1998  [JP]  Japan ................................. 10-093590

[51] Int. Cl.$^7$ ........................... F16D 13/04; F16D 23/00; F16D 41/00; F16D 43/00
[52] U.S. Cl. .................. 192/35; 192/84.7; 192/107 M
[58] Field of Search .......................... 192/107 M, 107 R, 192/70.14, 113.36, 35, 54.52, 84.7; 148/238, 222

[56] References Cited

U.S. PATENT DOCUMENTS

| | | | |
|---|---|---|---|
| 4,702,779 | 10/1987 | Madsac et al. ....................... | 148/16.6 |
| 4,904,316 | 2/1990 | Dawes et al. ........................ | 148/318 |
| 4,924,984 | 5/1990 | Kennedy .............................. | 182/58 B |
| 5,176,236 | 1/1993 | Ghidorzi et al. ................... | 192/107 R |
| 5,366,419 | 11/1994 | Oda ....................................... | 475/160 |
| 5,954,173 | 9/1999 | Sakai et al. ............................ | 192/35 |

FOREIGN PATENT DOCUMENTS

| | | |
|---|---|---|
| 62-49025 | 3/1987 | Japan . |
| 1-145438 | 6/1989 | Japan . |
| 4-351329 | 12/1992 | Japan . |
| 5-22862 | 3/1993 | Japan . |
| 5-126164 | 5/1993 | Japan . |
| 7-71563 | 3/1995 | Japan . |
| 7-145837 | 6/1995 | Japan . |
| 7-224870 | 8/1995 | Japan . |
| 8-233003 | 9/1996 | Japan . |
| 11-153116 | 6/1999 | Japan . |

OTHER PUBLICATIONS

"Nitrotec Process for Mechanical Engineers", vol. 40, No. 3, Mar. 1992, pp. 93–102 (with English abstract).

*Primary Examiner*—Charles A. Marmor
*Assistant Examiner*—Tisha D. Waddell
*Attorney, Agent, or Firm*—Oblon, Spivak, McClelland, Maier & Neustadt, P.C.

[57] ABSTRACT

On a frictional engage surface of one of inner and outer clutch plates constructing a wet-type multi-disk clutch, a plurality of convex ridges are formed at an infinitesimal predetermined interval distance. Lubricating oil is kept between the convex ridges, so that the wedge operation in oil can be reduced, whereby the torque transfer characteristic can be improved. Further, a height of the convex ridge is set equal to or more than 1 $\mu$m and the interval distance of the convex ridge is set equal to or less than 600 $\mu$m, preferably.

In the configuration of the clutch plate, it is made of steel as a substrate. Further, a nitrogen diffusion layer, a nitrided layer and an oxidation tunic is formed on said nitrided layer are formed on the substrate in its order therefrom.

10 Claims, 12 Drawing Sheets

FIG. 7(A) (WITH CONVEX RIDGE)

FIG. 7(B) (PRIOR ART)

FIG. 8(A) (WITH CONVEX RIDGE)

FIG. 8(B) (WITH CONVEX RIDGE)

FIG. 9(A) (WITH ONLY GROOVE)

FIG. 9(B) (WITH ONLY GROOVE)

FIG. 10(A) (WITH CONVEX RIDGE)

FIG. 10(B) (WITH CONVEX RIDGE)

CLUTCH PLATE

BACKGROUND OF THE INVENTION

1. Field of the Invention

The present invention relates to a clutch plate, more particularly, to a clutch plate used for a drive force transmission device installed in a four-wheel drive vehicle.

2. Description of the Related Art

As an example of a drive force transmission device, it is disclosed in Japanese Patent Publication No. 7-71563. In this publication, it is disclosed that a clutch is arranged between outer and inner rotating members which are coaxially positioned relative-rotatably with each other. In the drive force transmission device, a torque is transferred between the outer and inner rotating members by frictionally engaging the clutch.

In the drive force transmission device disclosed in the publication, faced surfaces with each other of both inner and outer clutch plates constructing the clutch form to a frictional engage surface having a predetermined surface roughness, so that the torque can be transferred between the inner and outer rotating members by the frictional engage force on the frictional engage surface. Further, lubricating oil for lubricating the frictional engage surfaces slidably contacted is supplied thereto.

In the drive force transmission device described in the above-mentioned publication, plural eccentric grooves are formed on the frictional engage surface of one of the inner and outer clutch plates constructive of the clutch, while that of the other thereof is formed to be flat. In such a situation, the decrease of frictional coefficient $\mu$ by the wedge operation in oil can be prevented so as to keep the lubricating oil at a minimum filling in each of the eccentric grooves.

Further, in the drive force transmission device described in the above-mentioned publication, an interval distance between the adjacent two eccentric grooves formed on the frictional engage surface of one of the clutch plates is relatively widely formed. In a case that the eccentric groove is relatively new, it is possible to keep a predetermined surface roughness on the frictional engage surface, so that the lubricating oil is kept in the depression portion due to the surface roughness. Consequently, the clutch plates can be frictionally engaged with each other at the convex portion adjacent to the eccentric grooves. However, the convex portions adjacent to the eccentric grooves are specularly ground due to the long-term use of the drive force transmission device, so that the oil film is formed between the both frictional engage surface with facility. As a result, it is difficult to engage the clutch plates with each other.

Further, in a case that the concave-convex shape is still remained on the frictional engage surface due to the surface roughness, the lubricating oil is kept in space portions formed by the concave-convex shape on the frictional engage surface. In this situation, the oil pressure separating the frictional engage surfaces each other is generated due to the wedge operation of the lubricating oil kept therein at a portion where the space portions cross in a rotational direction, so that the frictional coefficient $\mu$ is decreased. Therefore, the function in the multi-disk clutch is deteriorated.

With this deterioration of function in the clutch, in a case that the rotational speed difference between the both clutch plates is small, the torque transfer characteristic becomes to be a negative inclination, i.e., the transmissive torque is gradually decreased as the rotational speed difference becomes to be large.

Further, between the both clutch plates, a gap exists due to the dispersion of the concave-convex shape on the frictional engage surface. In such a frictional clutch of electromagnetic type wherein the frictional clutch is frictionally engaged by the operation of magnetic force, the gap causes to decrease the operative magnetic force thereon, so that the frictional engage force of the frictional clutch decreases. Moreover, the gap does not keep at constant due to the dispersion of flatness (surface roughness) on each of the frictional clutches. Consequently, the dispersion of gap causes that of the torque transfer characteristic product by product in the frictional clutch of the electromagnetic type.

SUMMARY OF THE INVENTION

Accordingly, an object of the present invention is to solve the above mentioned problems.

Briefly, according to the present invention, a clutch plate used for a drive force transmission device is provided with plural convex ridge circumferentially formed parallel with each other at an infinitesimal interval distance on a frictional engage surface of the clutch plate. Further, a height of the convex ridge is set equal to or more than 1 $\mu$m, and the interval distance of the convex ridge is set equal to or less than 600 $\mu$m.

With this construction, the convex ridge is still remained even if the drive force transmission device is used for a long term, so that the oil film between the frictional engage surfaces of the drive force transmission device can be prevented, whereby the torque transfer characteristic can be improved.

Further, the convex ridges are circumferentially formed, so that the wedge operation in oil can be reduced. Therefore, the oil film can be further prevented from being formed. Furthermore, the minimum lubricating oil is held between the convex ridges, the lubricating function is still remained. In a case this construction is adopted to an electromagnet type frictional clutch, the operative magnetic force can act suitably. With this construction, the torque transfer characteristic can be improved and, resistibility injudder and responsibility can be also improved. As a result, the scuffing torque due to viscosity of the oil film can be reduced, so that the endurance can be improved.

Moreover, on the surface of the clutch plate, there are formed a nitrogen diffusion layer, a nitrided layer and an oxidation tunic in its order, i.e., a multi-layer configuration by performing a gas-softening nitriding process, an oxidation process and quenching process on a substrate made of steel. Therefore, resistibility in corrosion, wear and fatigue can be multiplicatively increased, so that the frictional engage surface can be prevented from being ground specularly. As a result, it can be restrained that the transmissive torque between the both clutch plates is decreased due to the specularity of the frictional engage surfaces, so that the torque transfer characteristic in the electromagnetic type frictional clutch can be improved.

In this case, the multi-layer configuration is formed on one of the inner and outer clutch plates, the difference in hardness exists therebetween. Consequently, the transmissive torque becomes to be large due to the difference in hardness. Further, the magnetic permeability in the clutch plate having the multi-layer configuration is decreased by its configuration. However, the decrease in magnetic force functions to reduce the influence about the dispersion of flatness (surface roughness) on the clutch plate, so that it is also possible to reduce the dispersion in torque transfer characteristic of the electromagnetic type frictional clutch product by product.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

An embodiment according to the present invention will be hereinafter described with reference to the accompanying drawings.

Figure 1:
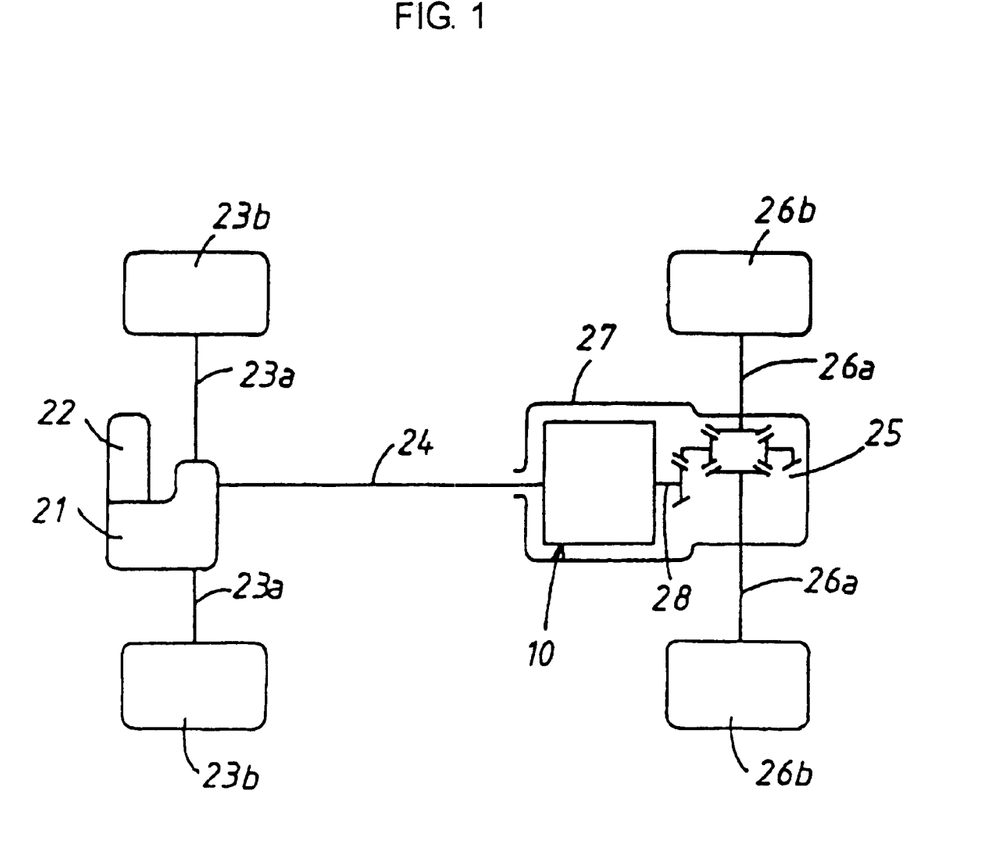
FIG. 1 is a general diagram showing a four-wheel drive vehicle in which a drive force transmission device is installed.
Figure 2:
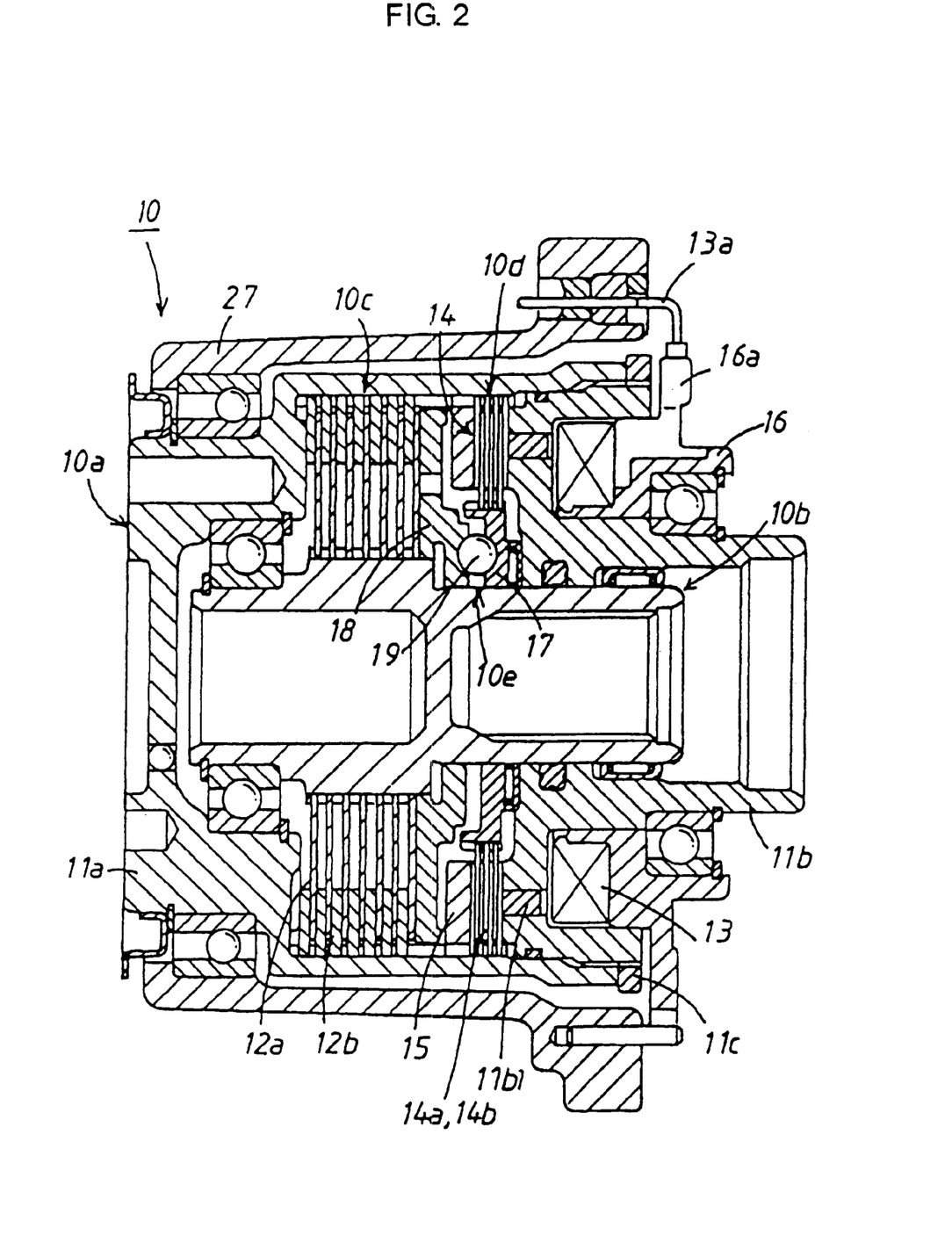
FIG. 2 is a cross-sectional view showing an example of a drive force transmission device according to the present invention.

FIG. 2 shows an example of a drive force transmission device 10 to which a frictional clutch mechanism according to the present invention is installed as a constructional member. The drive force transmission device 10 is mounted onto a four-wheel drive vehicle (referred to as a 4WD vehicle hereinafter) to transmit a driving force from a front wheel side to a rear wheel side, as shown in FIG. 1.

In the 4WD vehicle, a transaxle 21 is formed together with a transmission, a transfer and a front differential through which the driving force from an engine 22 is transferred to both of axle shafts 23a, whereby right-left front wheels 23b can be driven. The driving force from the engine 22 is also transferred through the transaxle 21 to a propeller shaft 24 which is connected with a rear differential 25 through the drive force transmission device 10. In a case that the propeller shaft 24 is torque-transmittably connected with the rear differential 25, the driving force is transferred to the rear differential 25 through the drive force transmission device 10. Subsequently, the driving force is transferred from the rear differential 25 to both of axle shafts 26a, whereby left-right rear wheels 26b can be driven.

The drive force transmission device 10 is disposed together with the rear differential 25 within a differential carrier 27 onto which the drive force transmission device 10 is supported. Further, the drive force transmission device 10 is supported through the differential carrier 27. As shown in FIG. 2, the drive force transmission device 10 is composed of an outer case 10a serving as an outer rotational member, an inner shaft 10b serving as an inner rotational member, a main clutch mechanism 10c, a pilot clutch mechanism 10d and a cam mechanism 10e.

The outer case 10a is constructed with a front housing 11a in the form of a cylindrical shape having a bottom, and a rear housing 11b which is threadedly engaged with the front housing 11a at an opening portion of a rear end thereof whose opening portion is closed by the inner shaft 10b. The front housing is made of aluminum alloy that is a nonmagnetic material, and the rear housing is made of steel that is a magnetic material. In a middle portion of the rear housing 11b in a radial direction thereof, there is disposed a cylindrical member $11b_1$ made of stainless steel which forms a cylindrical nonmagnetic portion.

A nut member 11c is movably engaged with a screw portion formed at an outer peripheral portion of a rear end of the rear housing 11b. The rear end of the front housing 11a is screwed by the nut member 11c, so that the screw portion of the front housing 11a is urged toward that of the rear housing 11b, whereby it is possible to eliminate the clearance between the both screw portions of the front and rear housings 11a and 11b.

The outer case 10a is rotatably supported to the differential carrier 27 at an outer peripheral portion of a front end of the front housing 11a, and is also rotatably supported thereto at an outer peripheral portion of a rear end of the rear housing 11b. Further, the end portion of the front housing 11a is torque-transmittably connected with a rear end portion of the propeller shaft 24.

The inner shaft 10b is inserted into the front housing 11a so as to fluidly obturate a central portion of the rear housing 11b. Further, the inner shaft 10b is rotatably supported with the front and rear housings 11a and 11b under a condition of being restrained to be movable in an axial direction. In such a condition, a top end portion of a drive pinion shaft 28 is inserted into the inner shaft 10b to be torque-transmittably connected therebetween.

The main clutch mechanism 10c, i.e., a frictional clutch in the form of a wet multi-disk type is composed of a plurality of clutch plates (inner clutch plates 12a and outer clutch plates 12b), and is arranged at the bottom side of front housing 11a. Each of the inner plates 12a constitutive of the frictional clutch is movably assembled in the axial direction to be spline-engaged with an outer peripheral portion of the inner shaft 10b. Similarly, each of the outer clutch plates 12b is also movably assembled in the axial direction with being spline-engaged with an inside surface portion of the front housing 11a. The inner and outer plates 12a and 12b are alternately positioned so as to be contacted with each other. Therefore, the inner and outer plates 12a and 12b are frictionally engaged with each other, and arranged movably in the axial direction, thereby being brought into a free state in each thereof The pilot clutch mechanism 10d comprises an electromagnet 13, a frictional clutch 13 and an armature 15. The electromagnet 13 is cylindrically formed and press-fitted into a cylindrical depression of the rear housing 11b by being attached to a yoke 16 which is supported onto the differential carrier 27 and is rotatably supported around the outer peripheral portion of the rear end of the rear housing 11b.

A frictional clutch 14 of a wet multi-disk type is composed of clutch plates according to the present invention. Each of inner clutch plates 14a is slidably assembled in the axial direction with being spline-engaged with an outer peripheral portion of a first cam member 17 of a cam mechanism 10e (described hereafter in detail). Similarly, each of outer clutch plates 14b is slidably assembled in the axial direction to be spline-engaged with an inner portion of the front housing 11a. The inner and outer plates 14a and 14b are alternatively positioned thereby can be contacted with each other. Therefore, the inner and outer plates 14a and 14b are frictionally engaged with each other and arranged movably in the axial direction, thereby being brought into a free state in each thereof The armature 15 formed cylindrically is movably assembled in the axial direction to be spline-engaged with the inner portion of the front housing 11a, and is arranged at a position facing with the electromagnet 13 as centrally of the frictional clutch 14.

As described above about the construction of the pilot clutch 10d, a magnetic path is established around the electromagnet 13 through the yoke 16, the rear housing 11b, the frictional clutch 14, the armature 15, the frictional clutch 14, the rear housing 11b and the yoke 16 by exciting the electromagnet 13. Besides, it is possible to select three modes described hereafter with electriferously changing an electromagnetic coil of the electromagnet 13 by a switch. The switch is arranged in the vicinity of a driver's seat in a cabin of the vehicle, and can be facilely operated by the driver. Further, it may be possible to omit the switch in a case that the drive force transmission device is adapted to the second mode described hereafter.

The cam mechanism 10e is constructed with the first cam member 17, the second cam member 18 and the cam follower 19. On the first and second cam members 17 and 18, cam grooves are respectively formed at a predetermined interval distance on cam surfaces facing with each other. The first cam member 17 is rotatably engaged on the outer peripheral portion of the inner shaft 10b, and is rotatably supported with the rear housing 11b, on which of the outer peripheral portion each of the inner clutch plates 14a of the frictional clutch 14 is slidably engaged in the axial direction.

The second cam member 18 is spline-engaged with the inner shaft 10b so as to be rotatable therewith and is arranged at a position facing with the inner clutch plate 12a of the main clutch mechanism 10c. The cam follower 19 taken in the form of a ball is disposed between the cam grooves defined at the cam surfaces facing with each other of the first and second cam members 17 and 18.

Further, in a lead line 13a for supplying current to the electromagnetic coil of the electromagnet 13, its top portion aside of the electromagnetic coil is immersed in a support member 16a which is made of a synthetic resin (plastic) and is engaged with the yoke 16. With this construction, it is avoided that the lead line 13a is contacted with the outer case 10a that is a rotating member, whereby the lead line 13a can be prevented from being cut by the contact therewith.

In the drive force transmission device 10, on the other hand, an X-ring seal is provided between the inner shaft 10b and the rear housing 11b, and an O-ring seal is provided between the front and rear housings 11a and 11b. Therefore, lubricating oil is fluid-tightly kept by the X-ring and O-ring seals within a space defined by the inner shaft 10b and the front and rear housings 11a and 11b. As a result, the main clutch mechanism 10c and the pilot clutch mechanism 10d are always steeped in the lubricating oil.

As constructed above, when the current is not supplied to the electromagnetic coil of the electromagnet 13 constructive of the pilot clutch mechanism 10d, the magnetic path is not established, so that the frictional clutch 14 can not be engaged. In such a state, the pilot clutch mechanism 10d is in a non-operation state, i.e., the first cam member 17 constructive of the cam mechanism 10e can be rotated with the second cam member 18 through the cam follower 19, whereby the main clutch mechanism 10c is kept in the non-operation state. Therefore, the vehicle is operated by front wheel drive, i.e., the first mode.

On the other hand, in a case that the current is being supplied to the electromagnetic coil of the electromagnet 13, since the magnetic path is established in the pilot clutch mechanism 10d, the armature 15 is magnetically attracted toward the electromagnet 13. In this case, the frictional clutch 14 is brought into engagement by the attraction of the armature 15 with the electromagnet 13, so that the first cam member 17 of the cam mechanism 10e is connected with the front housing 11a, whereby the rotational speed difference is generated between the first and second cam members 17 and 18. As a result of this connection, the second cam member 18 is traveled by the cam follower 19 in a separative direction from the first cam member 17, i.e., leftward in FIG. 2.

Namely, since the second cam member 18 is traveled toward the main clutch mechanism 10c, the main clutch mechanism 10c is frictionally engaged therewith in accordance with the frictional engagement force of the frictional clutch 14, whereby the torque transmission is performed from the outer case 10a to the inner shaft lob.

Therefore, a connective status between the propeller shaft 24 and the drive pinion shaft 28 is continuously changed from the non-connective status to a direct connective status.

This connective mode is referred to as the second mode. In the second mode, a driving force distribution ratio is controllably changed from 100:0 (front-wheel driving status) to 50:50 (direct four-wheel driving status) in correspondence with the driving status of the vehicle.

In a case that the current supplied to the electromagnetic coil of the electromagnet 13 is increased to a predetermined value, the armature 15 is further attracted toward the electromagnet 13 by the increase of an attractive force, so that the frictional engagement force of the frictional clutch 14 is amplified, whereby the rotational speed difference is increased between the first and second cam members 17 and 18. As a result, since the second cam member 18 is further moved toward the main clutch mechanism 10c by the cam follower 19, the main clutch 10c is consequently brought into direct engagement. Here, this status is referred to a direct four-wheel drive connecting the propeller shaft 24 with the drive pinion shaft 28, i.e., as the third mode.

Thus, in the drive force transmission device 10, with the current of supplying to the electromagnetic coil constructive of the electromagnet 13, the magnetic path is established around the yoke 16 supporting the electromagnet 13, the rear housing 11b, the frictional clutch 14, the armature 15, the frictional clutch 14, the rear housing 11b and the yoke 16. Therefore, the armature 15 is attracted toward the frictional clutch 14 due to the magnetic induction. Consequently, the frictional clutch 14 is frictionally engaged therein by the attractive force of the armature 15, so that the outer case 10a is torque-transmissively connected with the inner shaft 10b by the frictional engagement. In this state, the torque is transferred from the outer case 10a to the inner shaft 10b in correspondence with the frictional engagement force.

Figure 3:
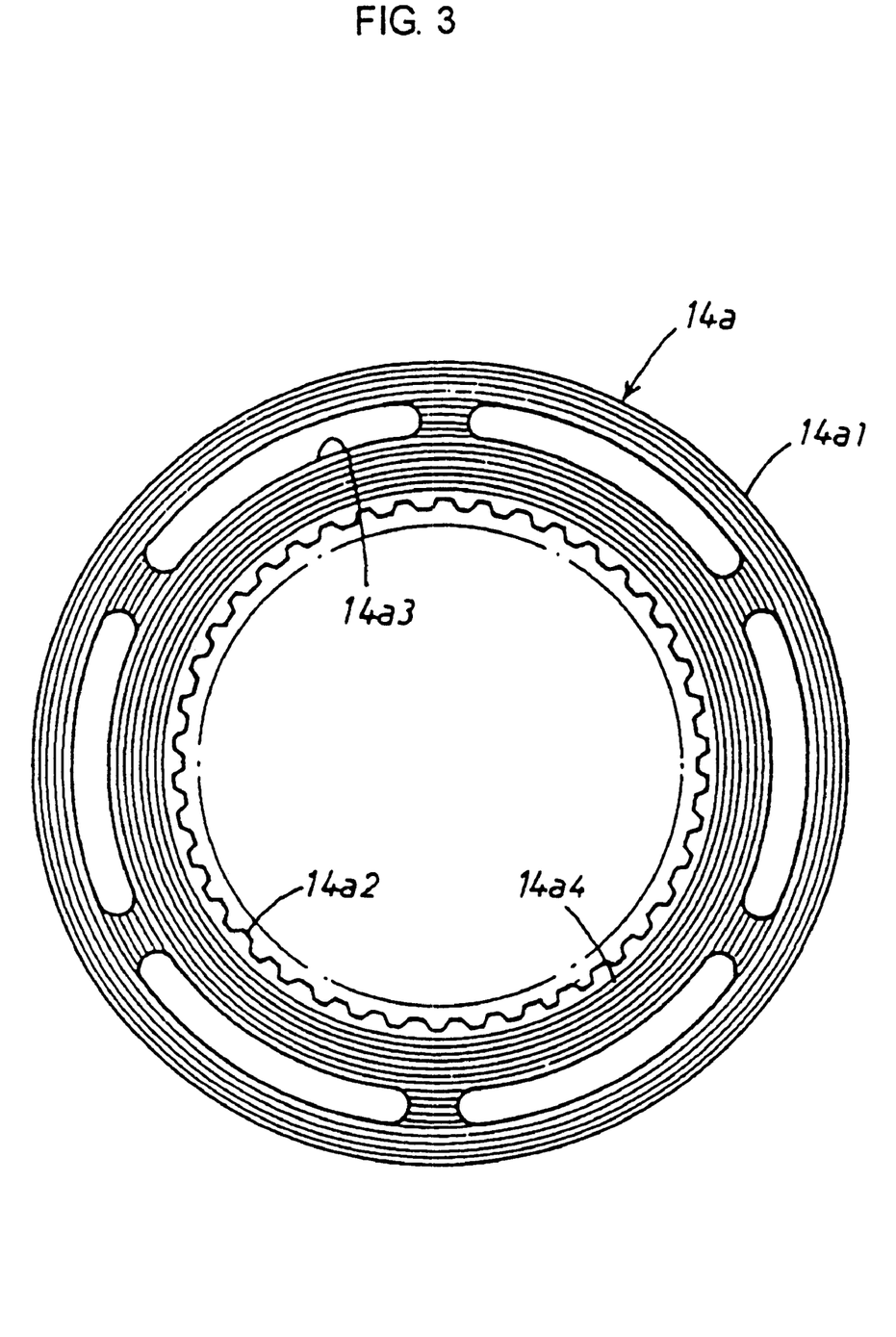
FIG. 3 is a front view showing an inner clutch plate of a frictional clutch constructing a pilot clutch mechanism in the drive force transmission device.

In the drive force transmission device 10, the inner clutch plate 14a constructive of the pilot clutch mechanism 14 is circularly formed as shown in FIG. 3, in which a spline portion $14a_2$ is formed at an inner end portion of a plate body $14a_1$ so as to be engaged with the spline portion of the first cam member 17. On a middle portion of the plate body $14a_1$, there are circumferentially formed a plurality of penetration holes $14a_3$ for preventing from the short of the magnetic flux.

Besides, the outer clutch plates 14b constructive of the frictional clutch 14 are circularly formed similarly to the inner clutch plate 14a, in which a spline portion is formed at an outer end of a plate body so as to be engaged with the spline portion of the front housing 11a. On a middle portion of the plate body, there are circumferentially formed a plurality of penetration holes for preventing from the short of the magnetic flux. Further, surface of the both inner and outer clutch plates 14a and 14b are formed to a frictional engage surface having a predetermined surface roughness.

Figure 4:
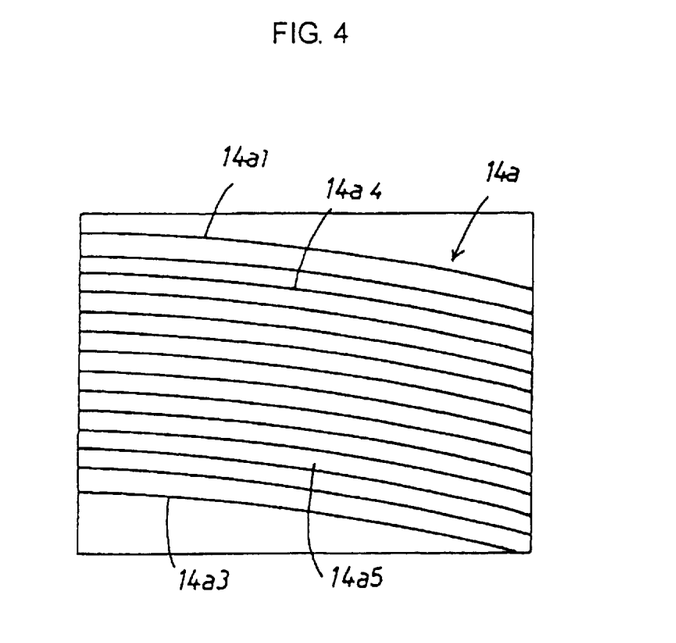
FIG. 4 is a partially enlarged view showing a frictional engage surface of the inner clutch plate.

In the inner clutch plate 14a as shown FIGS. 3 and 4, convex ridges $14a_4$ having a minute width are formed parallel with each other at an infinitesimal interval distance on the frictional engage surface as a whole. Each of the convex ridges $14a_4$ is coaxially arranged in a radial direction. The interval distance $h_2$ is set to a predetermined value less than 600 μm on a condition that the height $h_1$ of the convex ridge $14a_4$ is maintained over 1 μm after the long-term use of the drive force transmission device 10. Further, it becomes to be a range from 3 μm to 20 μtm such a depth of a groove portion $14a_5$ relatively formed at the same time when the convex ridge $14a_4$ is formed.

Herein, the contact area between the frictional engage surfaces becomes to be small as the interval distance $h_2$ of the convex ridge $14a_4$ become to be large, whereby it is difficult to generate oil film. In consideration of frictional wear in the long-term use, the interval distance $h_2$ may be preferably set less 600 μm. For example, in a case that the surface hardness of the plate body $14a_1$ is Hv 500, it is appropriate to set the height $h_1$ of the convex ridge $14a_4$ to more than 4–5 μm and it is also appropriate to set the interval distance $h_2$ thereof to 100–300 μm.

It is considered to cut the groove portions $14a_5$ by cutting machining operation with a diamond cutting tool as one of methods first forming a plurality of the convex ridges $14a_4$ on the frictional engage surface of the plate body $14a_1$. As a result of the cutting machining operation of the groove portions $14a_5$, the convex ridge $14a_4$ is relatively formed against the groove portion $14a_5$. On the other hand, it can be adopted to form the convex ridges $14a_4$ by press-forming operation as another method.

Figure 5:
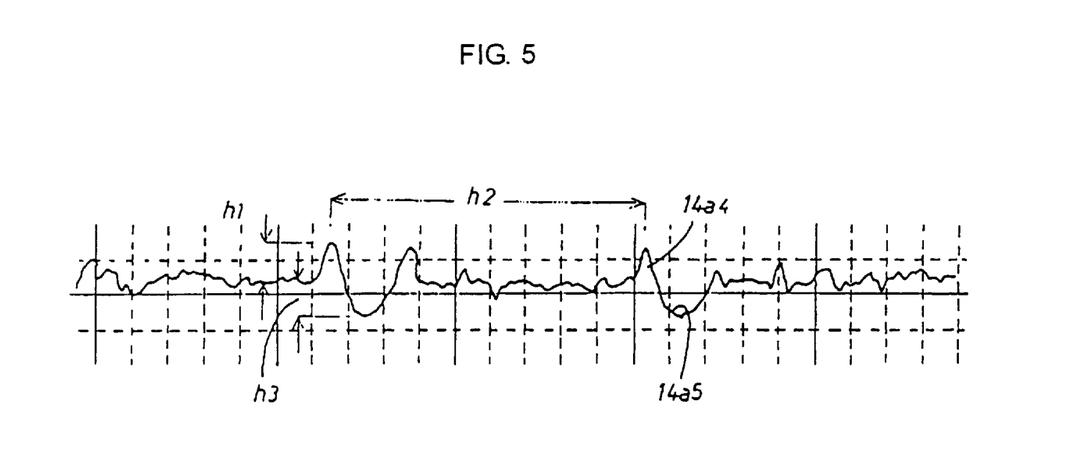
FIG. 5 is a chart showing a concave-concave shape on the frictional engage surface.

As an example, FIG. 5 shows a surface shape of the clutch plate 14a in a case that the convex ridge $14a_4$ is formed by the cutting machining operation with the diamond cutting tool. In this cutting machining operation, the convex ridge $14a_4$ is relatively formed in a reverse direction with the groove portion $14a_5$, so that the cutting machining operation is repeated at many times, whereby a plurality of the convex ridges $14a_4$ are formed on the frictional engage surface of the plate body $14a_1$.

On the other hand, in a case that the convex ridges $14a_4$ are formed by the press-forming operation, it is appropriate to form the convex ridges $14a_4$ at a small interval distance $h_2$, as compared with the cutting machining operation thereof with the diamond cutting tool. Namely, a projection between the groove portions $14a_5$ can be regarded as the convex ridge $14a_4$ by forming the groove portions $14a_5$ at a small interval distance.

Besides, even if the convex ridges $14a_4$ are formed by the cutting machining operation with the diamond cutting tool, the interval distance $h_2$ thereof may be formed generally same as that of the convex ridges $14a_4$ formed by the press-forming operation.

In the drive force transmission device 10 constructed above, each of the minute convex ridges $14a_4$ is circumferentially provided parallel with each other at the infinitesimal interval distance on the frictional engage surface of the inner clutch plate 14a constructive of the frictional clutch 14 of the pilot clutch mechanism 10d. With this construction, each of the convex ridges $14a_4$ is still maintained against the long-term use of the drive force transmission device 10, so that it can be prevented that the oil film is formed between the both inner and outer clutch plates 14a and 14b.

Moreover, since each of the convex ridges $14a_4$ is circumferentially formed, the wedge operation (effect) in oil cannot be generated therebetween, whereby the formation of the oil film can be further prevented. As a result, the lubricant function can be maintained with the required minimum oil. Further, the active magnetic force can be stabilized in the pilot clutch mechanism 10d. On a surface of the outer clutch plate 14b, there are formed lubricant grooves (not shown), so that the lubrication and cooling of the pilot clutch mechanism 10d can be performed in a good condition.

Consequently, since the torque transfer characteristics can be improved, the durability in judder and responsibility can be also improved. Further, the scuffing torque by the viscidity of the oil film can be diminished, so that the durability can be further improved.

[Experimental Case]

It is considered such an influence acting on the frictional engage force against the frictional clutch 14 by the a plurality of the convex ridges $14a_4$ shown in FIG. 4 which are formed on the frictional engage surface of the inner clutch plate 14a constructive of the frictional clutch 14 of the pilot clutch mechanism 10d. It is further considered such a torque transfer characteristic of the drive force transmission device 10 shown in FIG. 2 in which the same pilot clutch is assembled therein.

(Experimental Case 1)

Figure 6:
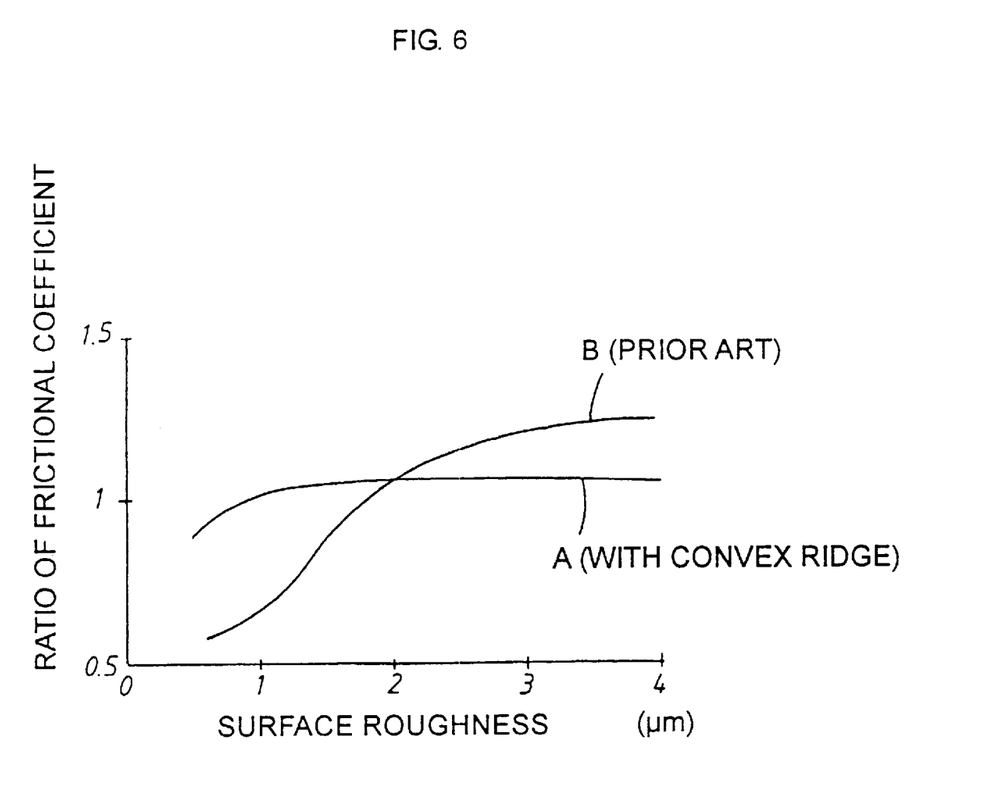
FIG. 6 is a graph showing the relationship between ratio of frictional coefficient in the frictional clutch and surface roughness.
Figure 7A:
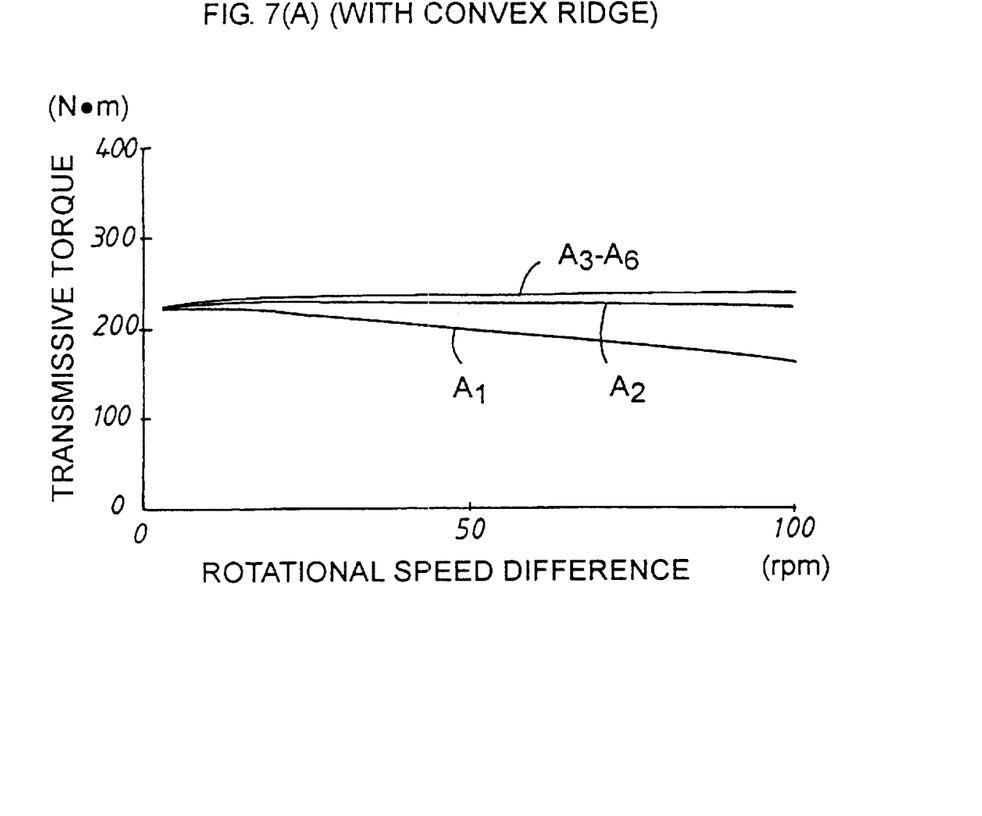
FIGS. 7(A) and 7(B) are graphs showing the torque transfer characteristics of the transmissive torque in the drive force transmission device relative to the rotational speed difference as parameters of surface roughness of the inner clutch plate in which the curve A represents a case that convex ridges are formed on a frictional engage surface of the inner clutch plate and which the curve B represents a case that no convex ridge exists thereon.
Figure 7B:
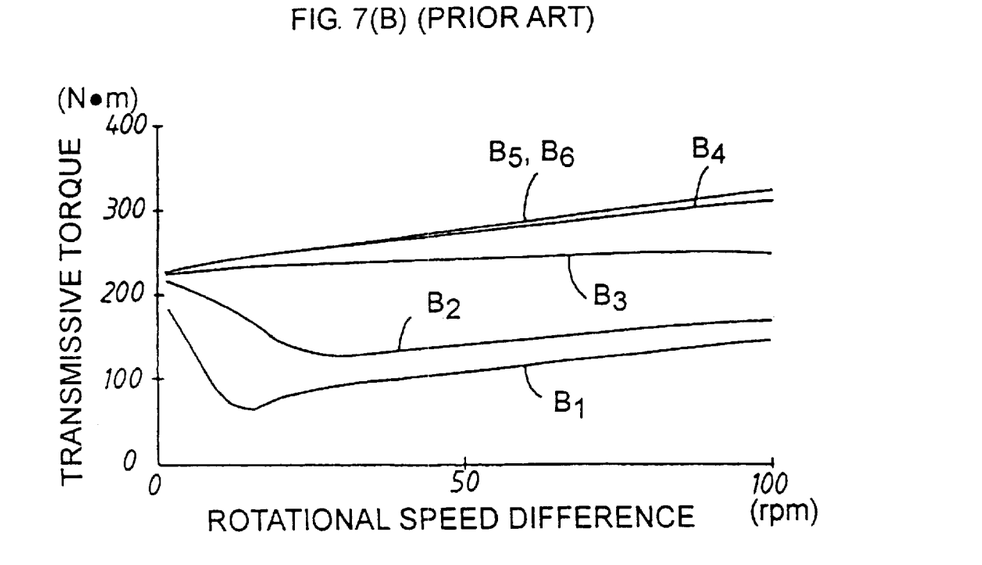

In this experimental case 1, the surface roughness of the inner clutch plate 14a constructive of the frictional clutch 14 is set to same as that of the outer clutch plate 14b. In such a condition, it is measured such a ratio of the frictional coefficient between the both clutch plates 14a and 14b of the frictional clutch 14 in each of the surface roughness and a torque transfer characteristic in the drive force transmission device 10. FIGS. 6, 7(A) and 7(B) show graphs in the measured result.

Further, the height $h_1$, the interval distance $h_2$ and the depth $h_3$ of the groove portion $14a_5$ are respectively set to 4 $\mu$m, 275 $\mu$m and 4 $\mu$m, as the experimental condition in the convex ridges $14a_4$ in the inner clutch plates 14a. In the drive force transmission device 10, the thrust force by the armature 15 of the pilot clutch mechanism 10d is set to 500 N. Moreover, the ratio of the frictional coefficient in FIG. 6 represents the ratio between the frictional coefficient ($\mu$50 rpm) at the rotational speed difference 50 rpm and the frictional coefficient ($\mu$2 rpm) at the rotational speed difference 2 rpm, i.e., the ratio ($\mu$50 rpm/$\mu$2 rpm).

In the graph of FIG. 6, the curve A presents a case that there are formed a plurality of the convex ridges $14a_4$ on the frictional engage surface, and the curve B presents a case that no convex ridges $14a_4$ exists thereon. As understood from FIG. 6, there is a large difference due to the ratio of the frictional coefficient. Namely, in the case that the convex ridges $14a_4$ exist on the frictional engage surface, it is so characterized that the curve A does not change at a certain value which is slightly larger than 1 in the ratio of the frictional coefficient where a range exceeds 1 in the surface roughness. On the other hand, in the case that the no convex ridge $14a_4$ exists on the frictional engage surface (i.e., the curve B), the ratio of the frictional coefficient changes around at 0.5 where the range of the surface roughness is less than 1 $\mu$m. The ratio of the frictional coefficient then gradually increases in accordance with the increase of the surface roughness, and it subsequently exceeds 1 where the range of the surface roughness exceeds 2 $\mu$m. As a result, it is so understood that the ratio of the frictional coefficient unusually changes in accordance with the surface roughness where no convex ridge $14a_4$ exists on the frictional engage surface (i.e., the curve B).

FIG. 7(A) shows the relationship between the transmissive torque and the rotational speed difference in the drive force transmission device 10 of a case that the convex ridges $14a_4$ are formed on the inner clutch plate 14a. In this graph, the curves $A_1$, $A_2$, $A_3$, $A_4$, $A_5$ and $A_6$ represent the characteristics in that the surface roughness of the frictional engage surface are set to 0.5 $\mu$m, 1 $\mu$m, 2 $\mu$m, 3 $\mu$m, 4 $\mu$m and 5 $\mu$m, respectively. Further, FIG. 7(B) shows the relationship between the transmissive torque and the rotational speed difference in the drive force transmission device 10 of a case that no convex ridge $14a_4$ exists on the inner clutch plate 14a. Similarly, in the graph of FIG. 7(B), the curves $B_1$, $B_2$, $B_3$, $B_4$, $B_5$ and $B_6$ represent the characteristics in that the surface roughness of the frictional engage surface are set to 0.5 $\mu$m, 1 $\mu$m, 2 $\mu$m, 3 $\mu$m, 4 $\mu$m and 5 $\mu$m, respectively.

Referring to the graphs of FIG. 7(B), the characteristic in the drive force transmission device 10 is so envisaged that the transmissive torque jaggedly decreases in the small range of the rotational speed difference once and then gradually increases, in the case that no convex ridge $14a_4$ exists on the inner clutch plate 14a of the frictional clutch 14 and that the surface roughness on the both inner and outer clutch plates 14a and 14b is set equal to or less than 1 $\mu$m. To the contrary, referring to the graph of FIG. 7(A), in the case that the convex ridge $14a_4$ are formed on the inner clutch plate 14a of the frictional clutch 14 and that the surface roughness on the both inner and outer clutch plates 14a and 14b is set equal to or less than 1 $\mu$m, the transmissive torque slightly decreases as the rotational speed difference increases. In the same case, the transmissive torque does not change at a generally constant value regardless of the rotational speed difference even if the surface roughness on the both inner and outer clutch plates 14a and 14b exceeds 2 $\mu$m.

Accordingly, the torque transfer characteristic in the drive force transmission device 10 can be apparently improved in the case that the convex ridges $14a_4$ are formed on the inner clutch plate 14a, so that it is envisaged that the convex ridges $14a_4$ act effectively.

(Experimental Case 2)

Figure 8A:
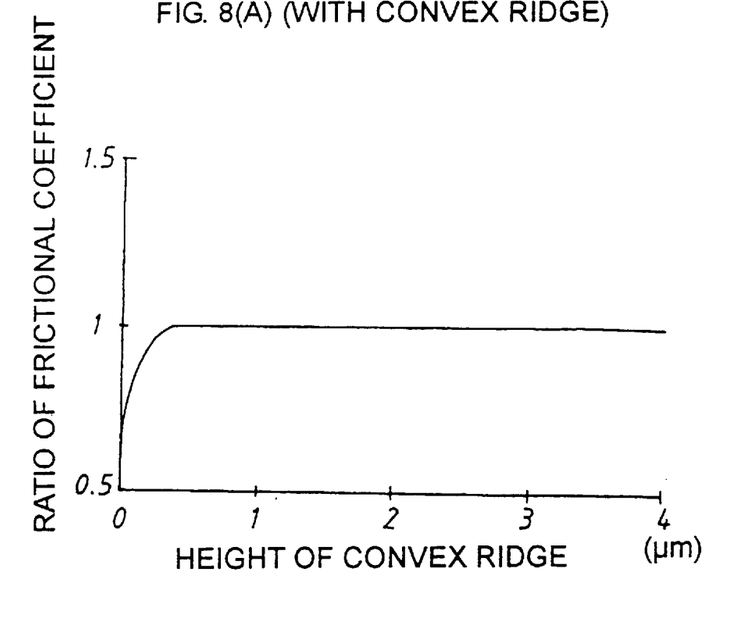
FIGS. 8(A) and 8(B) are graphs showing the relationship between the ratio of frictional coefficient in the frictional clutch and the height of the convex ridge, and the torque transfer characteristics of the transmissive torque in the drive force transmission device relative to the rotational speed difference in a case that the height of convex ridge is changed respectively.
Figure 8B:
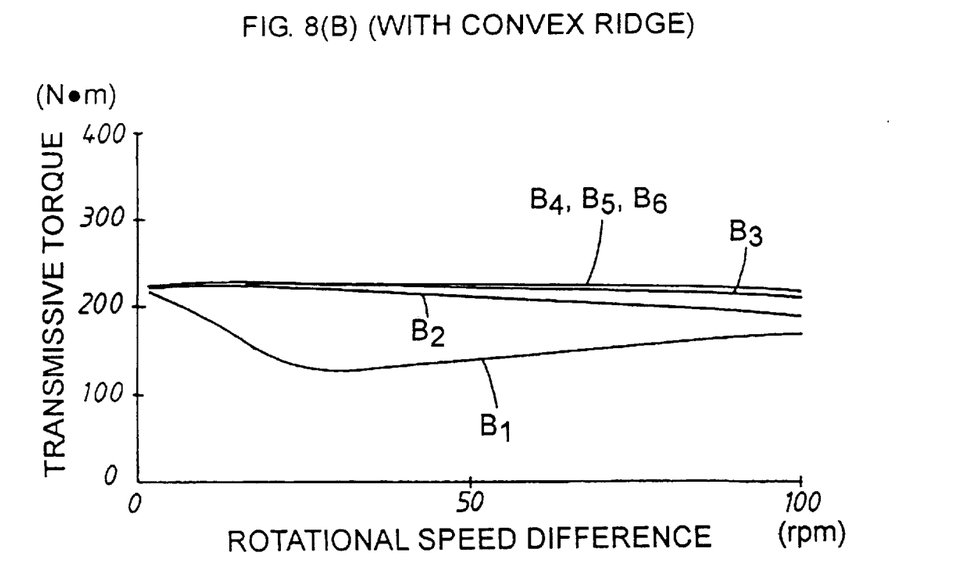

In the experimental case 2, it is considered such an effect in the height $h_1$ of the convex ridge $14a_4$ formed on the inner clutch plate 14a constructive of the frictional clutch 14a. FIG. 8(A) shows the experimental result about the relationship between the height $h_1$ of the convex ridge $14a_4$ and the ratio of the frictional coefficient, in the case that the surface roughness of the both inner and outer clutch plates 14a and 14b of the frictional clutch 14 is set to 1 $\mu$m and that the interval distance $h_2$ in each of the convex ridges $14a_4$ is set to 275 $\mu$m. Further, FIG. 8(B) shows the experimental result about the relationship between the transmissive torque and the rotational speed difference in the drive force transmission device 10 in the same setting in the measurement in FIG. 8(A). Besides, the other experimental condition is same as that in the experimental case 1.

Here, in FIG. 8(B), the curves $B_1$, $B_2$, $B_3$, $B_4$, $B_5$ and $B_6$ represent the experimental characteristics in that the height $h_1$ of the convex ridge $14a_4$ are set to 0 $\mu$m, 0.5 $\mu$m, 1 $\mu$m, 2 $\mu$m, 3 $\mu$m and 4 $\mu$m, respectively.

Referring to FIG. 8(A), it is apparently understood that the ratio of the frictional coefficient does not suitably change at 1 in the case that the height $h_1$ of the convex ridge $14a_4$ is set over at least 1 $\mu$m. Further, it is apparently understood that the transmissive torque in the drive force transmission device 10 converges to a generally constant value regardless of the rotational speed difference in the case that the height $h_1$ of the convex ridge $14a_4$ is set over at least 1 $\mu$m, as referred to FIG. 8(B). Therefore, the torque transfer characteristic in the drive force transmission device 10 can be apparently improved in the case that the height $h_1$ of the convex ridge $14a_4$ is set over at least 1 $\mu$m, so that it is envisaged that the convex ridges $14a_4$ act effectively.

(Experimental Case 3)

Figure 9A:
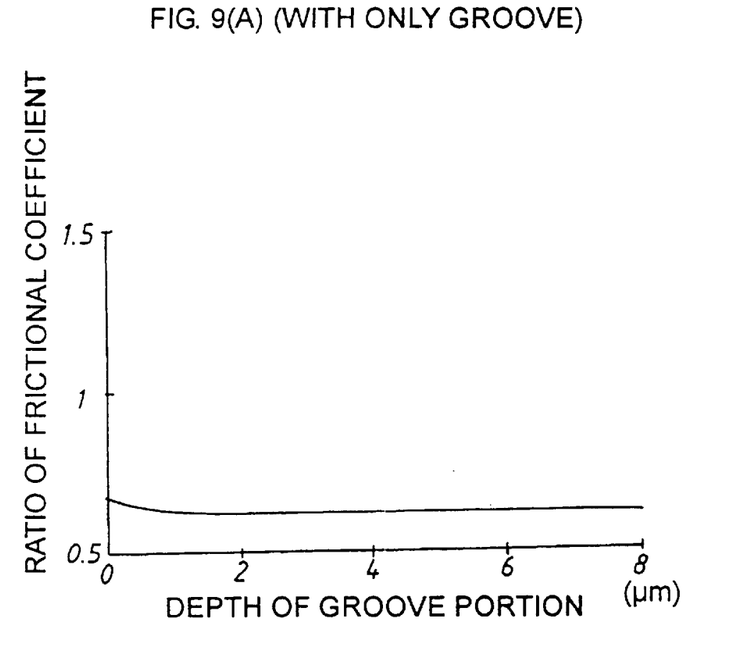
FIGS. 9(A) and 9(B) are graphs showing the relationship between the ratio of frictional coefficient in the frictional clutch and the depth of groove portion, and the torque transfer characteristics of the transmissive torque in the drive force transmission device relative to the rotational speed difference in a case that the depth of groove portion is changed, respectively.
Figure 9B:
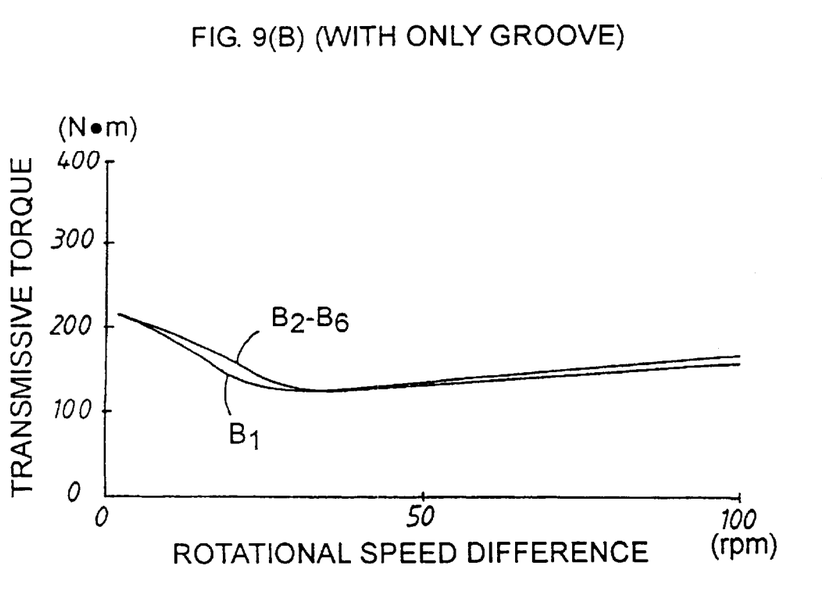

In the experimental case 3, it is considered such an effect in the case that only the groove portions $14a_5$ instead of the convex ridge $14a_4$ are formed on the inner clutch plate 14a constructive of the frictional clutch 14. FIG. 9(A) shows the experimental result about the relationship between the depth $h_3$ of the groove portion $14a_5$ and the ratio of the frictional coefficient, in the case that the surface roughness of the both inner and outer clutch plates 14a and 14b of the frictional clutch 14 is set to 1 μm and that an interval distance $h_4$ between the adjacent two groove portions $14a_5$ is set to 275 μm. Further, FIG. 9(B) shows the experimental result about the relationship between the transmissive torque and the rotational speed difference in the drive force transmission device 10 in the same setting in the measurement in FIG. 9(A). Besides, the other experimental condition is same as that in the experimental case 1.

Here, in FIG. 9(B), the curves $B_1$, $B_2$, $B_3$, $B_4$, $B_5$ and $B_6$ represent the experimental characteristics in that the depth $h_3$ of the groove portion $14a_5$ are set to 0 μm, 0.5 μm, 1 μm, 2 μm, 3 μm and 4 μm, respectively.

Referring to FIG. 9(A), it is apparently understood that the ratio of the frictional coefficient does not suitably change at a generally constant value less than 1 regardless of the depth $h_3$ of the groove portion $14a_5$, i.e., no effect is acted by the depth $h_3$ of the groove portion $14a_5$. Further, it is apparently understood that no effect act on the characteristic of the transmissive torque in the drive force transmission device 10, as referred to FIG. 9(B).

(Experimental Case 4)

Figure 10A:
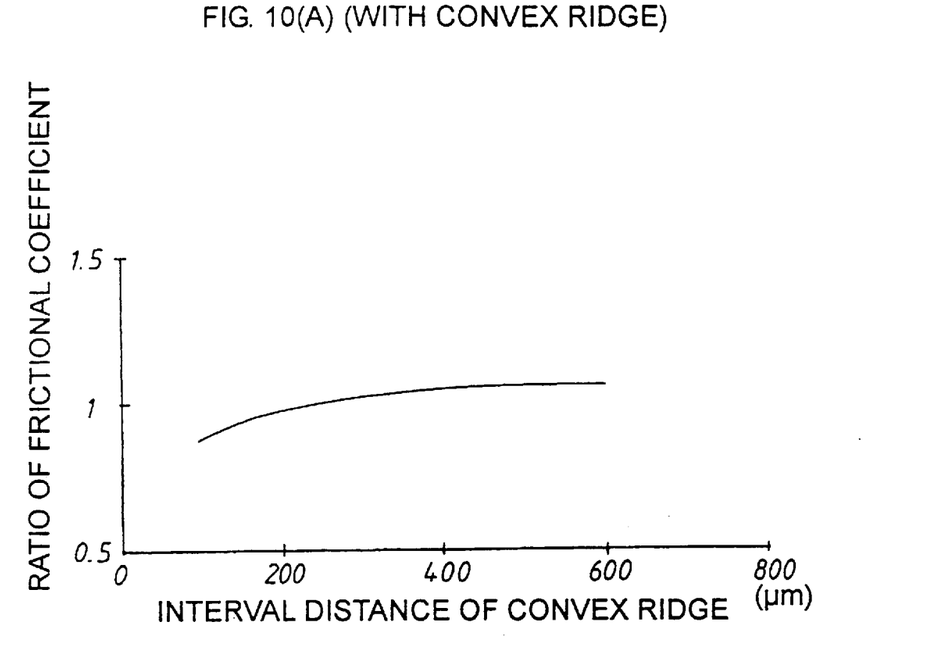
FIGS. 10(A) and 10(B) are graphs showing the relationship between the ratio of frictional coefficient in the frictional clutch and the interval distance of convex ridge, and the torque transfer characteristics of the transmissive torque in the drive force transmission device relative to the rotational speed difference in a case that the interval distance of convex ridge is changed, respectively.
Figure 10B:
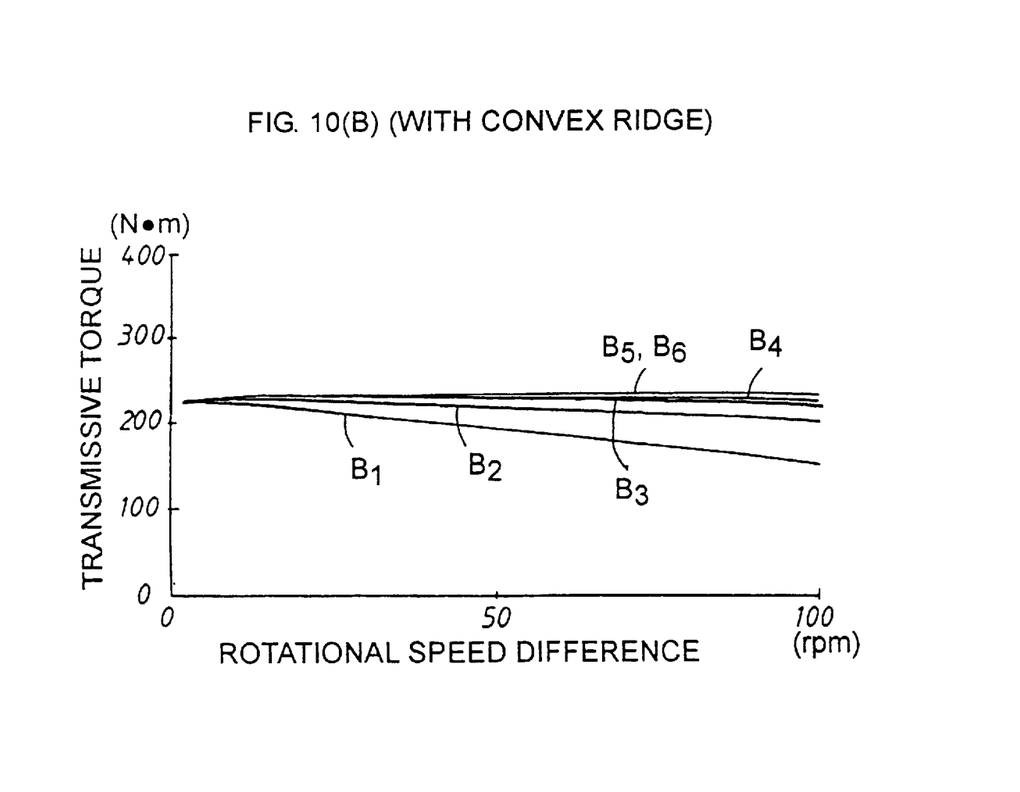

In the experimental case 4, it is considered such an effect about the interval distance $h_2$ between the adjacent two convex ridges $14a_4$ formed on the inner clutch plate 14a constructive of the frictional clutch 14. FIG. 10(A) shows the experimental result about the relationship between the interval distance $h_2$ of the convex ridge $14a_4$ and the ratio of the frictional coefficient, in the case that the surface roughness of the both inner and outer clutch plates 14a and 14b of the frictional clutch 14 is set to 1 μm and that the height $h_1$ of the convex ridge $14a_4$ is set to 1 μm. Further, FIG. 10(B) shows the experimental result about the relationship between the transmissive torque and the rotational speed difference in the drive force transmission device 10 in the same setting in the measurement in FIG. 10(A). Besides, the other experimental condition is same as that in the experimental case 1.

Here, in FIG. 10(B), the curves $B_1$, $B_2$, $B_3$, $B_4$, $B_5$ and $B_6$ represent the experimental characteristics in that the interval distance $h_2$ of the convex ridge $14a_4$ are set to 100 μm, 200 μm, 300 μm, 400 μm, 500 μm and 600 μm, respectively.

Referring to FIG. 10(A), it is apparently understood that the ratio of the frictional coefficient gradually increases until the interval distance $h_2$ of the convex ridge $14a_4$ reaches 200 μm, and that over 200 μm it does not suitably change at 1. Further, it is apparently understood that the transmissive torque in the drive force transmission device 10 becomes to be a constant value where the interval distance $h_2$ of the convex ridge $14a_4$ exceed 200 μm, as referred to FIG. 10(B).

(Experimental Case 5)

Figure 11A:
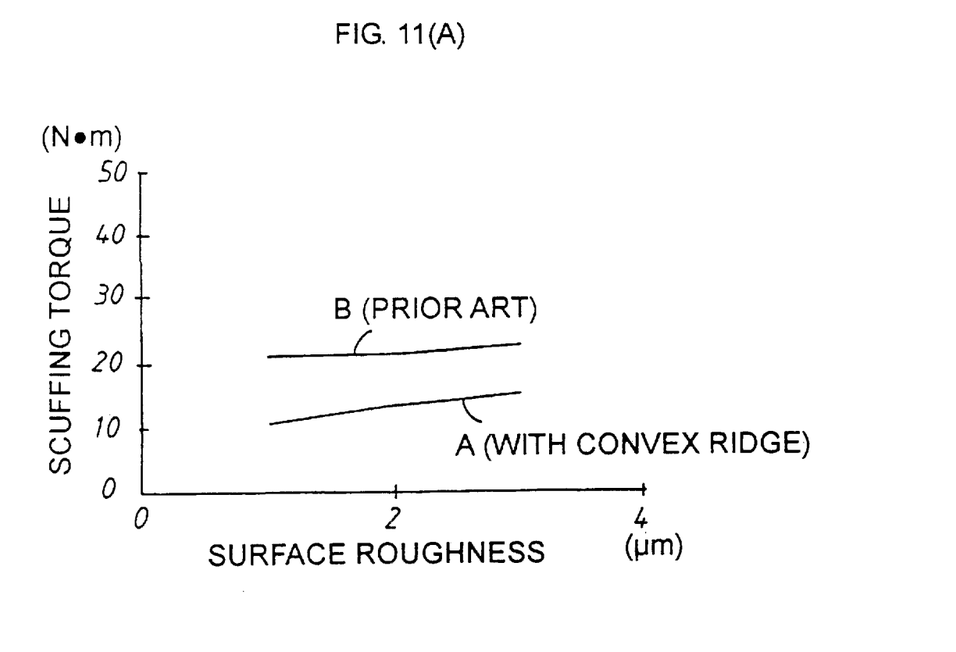
FIGS. 11(A) and 11(B) are graphs showing the relationship between the scuffing torque and the surface roughness on the inner clutch, and the torque transfer characteristics of the scuffing torque in the drive force transmission device relative to the rotational speed difference in a case that the surface roughness on the inner clutch is changed, respectively.
Figure 11B:
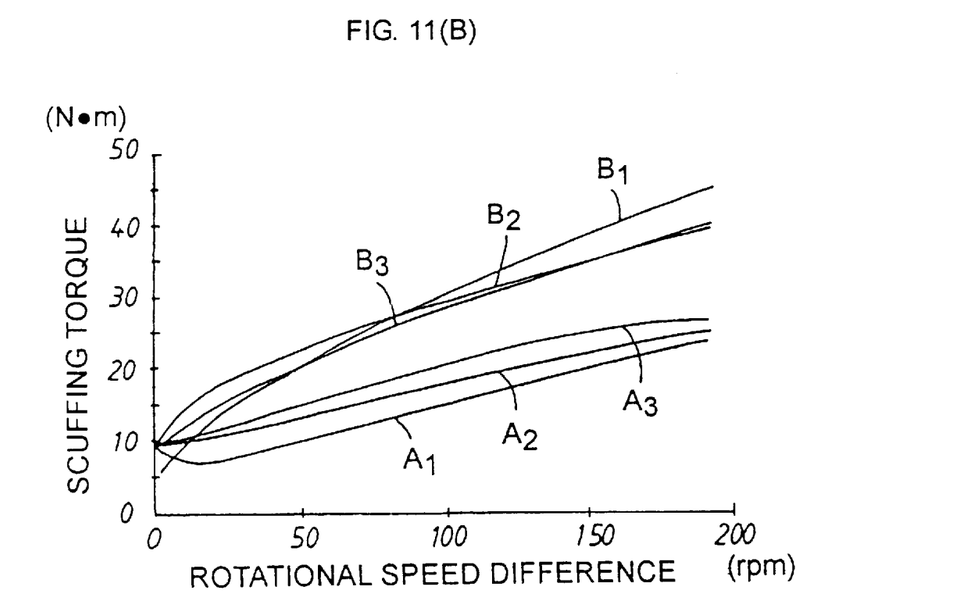

In the experimental case 4, it is considered such an effect about the scuffing torque due to the convex ridges $14a_4$ formed on the inner clutch plate 14a of which the frictional clutch 14 is constructed. FIG. 11(A) shows the experimental result about the relationship between the scuffing torque and the surface roughness on the both inner and outer clutch plates 14a and 14b of the frictional clutch 14, in which that the height $h_1$ of the convex ridge $14a_4$ is set to 1 μm and the interval distance $h_2$ thereof is set to 275 μm. Further, FIG. 11(B) shows the experimental result about the relationship between the transmissive torque and the rotational speed difference in the drive force transmission device 10 in the same setting in the measurement in FIG. 10(A). Besides, the attractive force of armature 15 in this experimental case is set to 20 N in the pilot clutch mechanism 10d of the drive force transmission device 10.

Here, in FIG. 11(A), the curves A and B represent the experimental characteristic in that the convex ridges $14a_4$ are formed on the frictional engage surface of the inner clutch plate 14a and that no convex ridges $14a_4$ is formed thereon, respectively. Further, the curves $A_1$, $A_2$ and $A_3$ in FIG. 11(B) represent the experimental characteristic in the case that the surface roughness is set to 1 μm, 2 μm and 3 μm where the convex ridges $14a_4$ are formed on the frictional engage surface of the inner clutch plate 14a, respectively. Similarly, the curves $B_1$, $B_2$ and $B_3$ represent the experimental characteristics in the case that the surface roughness is set to 1 μm, 2 μm and 3 μm where no convex ridge $14a_4$ is formed on the frictional engage surface, respectively.

Referring to FIG. 11(A), it is apparently understood from FIG. 11(B) that whether the convex ridges $14a_4$ exist or not on the frictional engage effectively acts on the scuffing torque in the drive force transmission device 10. Namely, in the case that the convex ridges $14a_4$ exist on the frictional engage, the scuffing torque widely decreases as compared with the case no convex ridge $14a_4$ is formed thereon.

(Modification)

In this embodiment, the convex ridge $14a_4$ is circumferentially formed coaxially with each other. However, the shape of the convex ridge $14a_4$ is not limited to the radial portion. For example, it can be adopted that the convex ridge $14a_4$ is formed to an ellipse or formed spirally.

(Manufacturing Method)

In the drive force transmission device 10, the inner clutch plate 14a in the frictional clutch 14 of the pilot clutch mechanism 10d is formed with a multi-layer manner that is basically configured by a substrate made of steel. To the contrary, the outer clutch plate 14b is formed with a single-layer manner that is formed from a substrate made of steel. Further, the frictional engage surface on each of the both inner and outer clutch plates 14a and 14b is formed to a predetermined surface roughness.

In the multi-layer configuration of the inner clutch plate 14a, a nitrogen diffusion layer is first formed on the surface of the substrate thereof, and then a nitrided layer is formed on the surface of the nitrogen diffusion layer. Further, an oxide tunic is formed on the surface of the nitrided layer, and a gas-nitriding-oxidation-quenching process is performed to such a multi-layer configuration.

The gas-nitriding-oxidation-quenching process is recently developed as a multi-layer surface process, and that is known as the NITROTEC® process (registered to Lucas, British company).

The NITROTEC® process is performed to the substrate of the inner clutch plate 14a that is same as that of the outer clutch plate 14b. For example, it is first performed to the substrate made of steel such a gas-softening-nitriding process that is heated for one or two hours at 500–600 degrees (° C.) in a nitrogen ambience. Subsequently, the oxidation process is performed to the substrate of the inner clutch plate 14a, in which the high temperature is kept in an oxygen ambience for a short time. Finally, the substrate of the inner clutch plate 14a is quenched in an emulsion of water-oil. As a result of this process, the multi-laver configuration of the inner clutch plate 14a is formed. Through this NITROTEC® process, the nitrogen diffusion layer and the nitrided layer are formed with around thickness of 20–40 μm, respectively. Further, the oxide tunic of the inner clutch plate 14a is formed with around thickness of 0.5–1.5 μm, so that the hardness on the surface thereof can be increased by the quenching process.

In the frictional clutch 14 of the pilot clutch plate 10d as constructed above, the multi-layer configuration adopted to the inner clutch plate 14a is of that is composed of the oxide tunic, since the nitrided layer and the nitrogen diffusion layer in this order from the top surface thereof, resistibility in corrosion, wear and fatigue can be multiplicatively increased, whereby the frictional engage surface can be prevented from being specularly ground.

Figure 12:
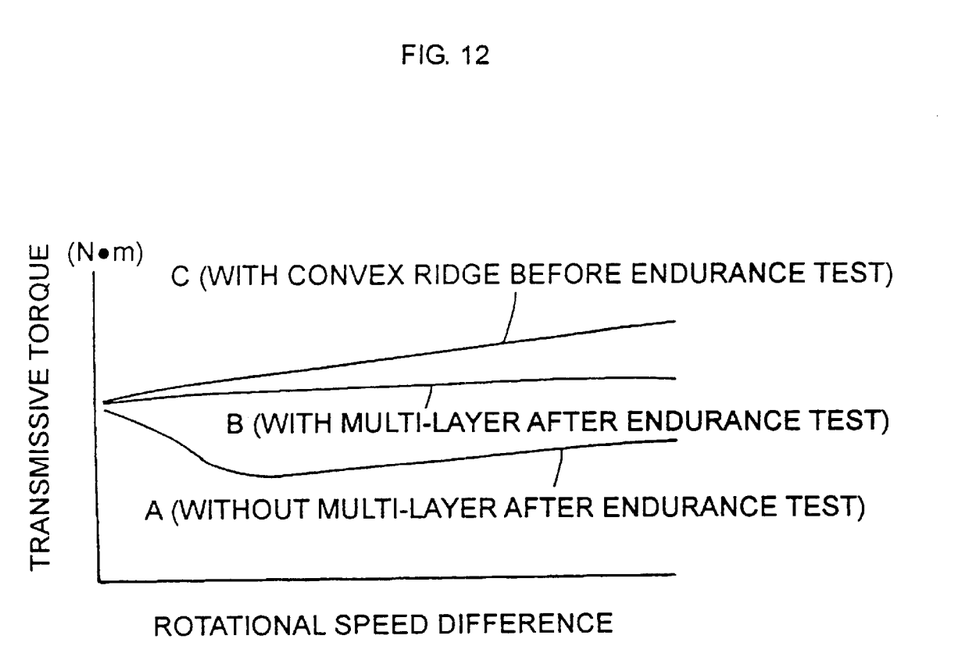
FIG. 12 is a graph showing the relationship between the transmissive torque and the rotational speed difference in cases that the multi-layer configurations is adopted on the inner clutch plate and in the case of the conventional clutch plate in the light of the endurance test.

FIG. 12 shows the graph of the relationship of the transmissive torque between the inner and outer clutch plates 14a and 14b and the rotational speed difference therebetween about the influence of the multi-layer configuration on the inner clutch plate 14a. A curve A represents the experimental result wherein the multi-layer configuration is not formed on the inner clutch plate 14a after the endurance test has been carried out thereon, i.e., in the conventional clutch plate. A curve B represents the experimental result wherein the multi-layer configuration is formed on the inner clutch plate 14a after the endurance test has been carried out thereon. A curve C represents the experimental result wherein only the convex ridges $14a_4$ without the multi-layer configuration are formed on the inner clutch plate 14a before the endurance test is carried out thereon. As shown by the curve B in FIG. 12, it can be prevented such a decrease of the transmissive torque between the inner and outer clutch plates 14a and 14b resulting in the oil film force generated on the both frictional engage surfaces therebetween due to the specularity of the frictional engage surface. Therefore, it is possible to improve the torque transfer characteristic in the drive force transmission device 10 in which the clutch plate 14a is formed with the multi-layer configuration, as compared with the conventional clutch plate shown by the curve A.

In this case, since the difference in hardness exists between the inner and outer clutch plates 14a and 14b, the transmissive torque can be increased, whereby this is advantageous to the torque transfer characteristics.

Further, the magnetic permeability in the inner clutch plate 14a is deteriorated due to its multi-layer configuration, and the strength in magnetic force is also deteriorated in little. However, the deterioration in magnetic force acts so as to decrease the dispersion of the flatness (surface roughness) on the inner clutch plate 14a, so that the dispersion of the torque transfer characteristic product by product can be also diminished in the electromagnetic type frictional clutch.

Figure 13:
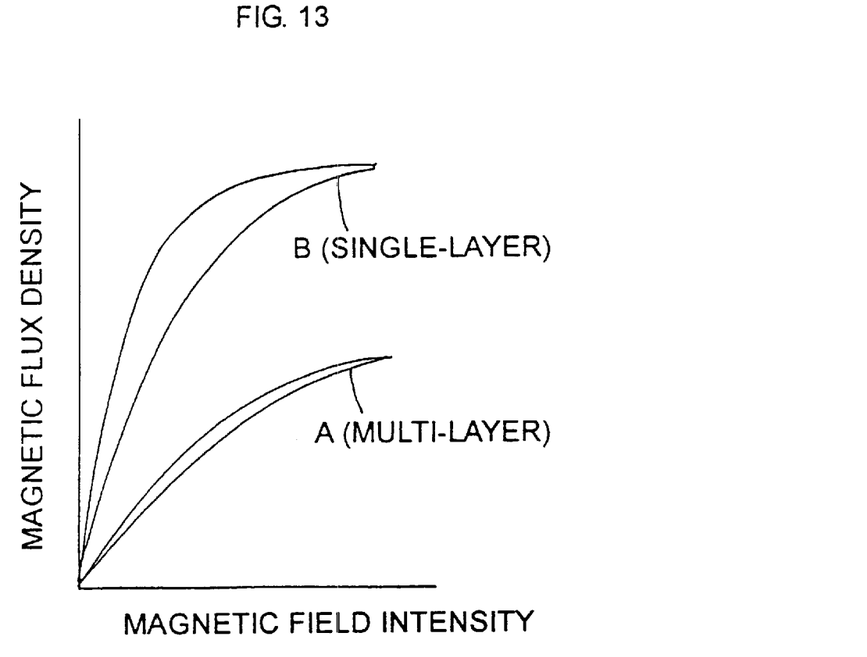
FIG. 13 is a graph showing the relationship between the magnetic flux density generated in the pilot clutch mechanism and the magnetic field intensity in cases that the single-layer and multi-layer configurations are respectively adopted on the inner clutch plate.

FIG. 13 is a graph showing the graph of the relationship between the magnetic flux density and the magnetic field intensity in each of the pilot clutch mechanisms 10d in cases that the multi-layer and single-layer configurations are respectively performed on the frictional engage surface of the inner clutch plate 14a. Further, FIG. 14 shows the graph of the relationship between the attractive force by the armature 15 and the flatness (surface roughness) on the clutch plate in the same case.

Figure 14:
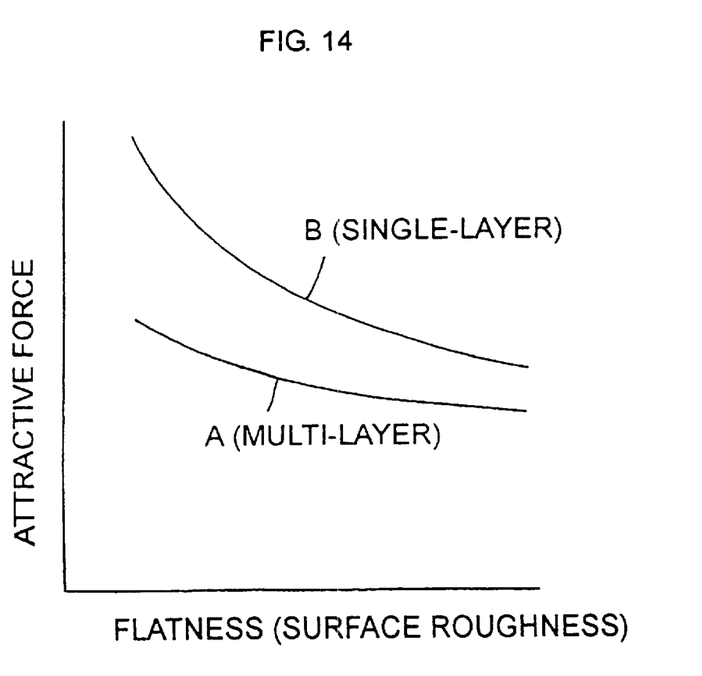
FIG. 14 is a graph showing the relationship between the attractive force by a armature and the flatness (surface roughness) on the inner clutch plate in cases that the single-layer and multi-layer configurations are respectively adopted thereon.

In the graphs shown in FIGS. 13 and 14, the graph A denotes the experimental result wherein the multi-layer configuration is formed on the inner clutch plate 14a, while the graph B denotes the experimental result wherein the single-layer configuration is formed thereon. As apparently understood from these experimental results, the magnetic field intensity in the case that the multi-layer configuration is performed on the inner clutch plate 14a is small, so that the attractive force against the armature 15 is small, as compared with the case that the single-layer configuration is performed thereon (see the curve A in FIGS. 13). Further, the change in the attractive force is small relative to the change of the flatness (surface roughness) on the frictional engage surface of the clutch plate. This means that the dispersion in the torque transfer characteristic product by product becomes to be small in the pilot clutch mechanism 10d.

Obviously, numerous modifications and variations of the present invention are possible in light of the above teachings. It is therefore to be understood that within the scope of the appended claims, the present invention may be practiced otherwise than as specifically described herein.

What is claimed is:

1. A clutch plate comprising:
    a plate member having a clutch friction engagement surface; and
    a plurality of circumferential convex ridges formed in parallel with one another on said friction engagement surface,
    wherein each of said ridges has a height greater than 1 $\mu$m, and wherein said ridges are mutually spaced by a distance which is not greater than 600 $\mu$m.

2. A clutch plate according to claim 1, wherein a shape of said convex ridge takes in the form of a circle or an ellipse.

3. A clutch plate according to claim 1, wherein said convex ridge is formed spirally.

4. A clutch plate according to claim 1, wherein said clutch plate is made of steel as a substrate, further comprising:
    a nitrogen diffusion layer formed on said clutch plate;
    a nitrided layer formed on said nitrogen diffusion layer; and
    an oxidation tunic formed on said nitrided layer.

5. A clutch plate according to claim 1, wherein said clutch plate is adopted to one of inner and outer clutch plates used for the drive force transmission device.

6. A clutch plate according to claim 1, wherein said clutch plate is adopted to one of inner and outer clutch plates of a pilot clutch mechanism in the drive force transmission device.

7. A clutch plate according to claim 1, wherein width of said convex ridge is formed to be minute.

8. A clutch plate according to claim 4, wherein said nitrogen diffusion layer, said nitrided layer and said oxidation tunic are formed on said substrate by performing a gas-softening nitriding process, an oxidation process and quenching process.

9. A clutch plate according to claim 6, wherein only the nitrogen diffusion layer is formed on the other of the inner and outer clutch plates of the pilot clutch mechanism in the drive force transmission device.

10. A clutch plate according to claim 6, further comprising:
    a first seal ring member provided between a front housing of the drive force transmission device and a rear housing thereof; and
    a second seal member provided between an inner shaft of the drive force transmission device and the rear housing thereof;
    wherein said pilot clutch mechanism is fluid-tightly disposed with said first and second seal rings in a space defined by the front and rear housings and the inner shaft.

* * * * *